(12) United States Patent
Mizuno et al.

(10) Patent No.: US 9,487,123 B2
(45) Date of Patent: Nov. 8, 2016

(54) VEHICULAR HEADLAMP APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Ryu Mizuno, Kariya (JP); Hajime Kasai, Kariya (JP); Tatsuya Takagaki, Nisshin (JP)

(73) Assignees: DENSO CORPORATION, Kariya, Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 25 days.

(21) Appl. No.: 14/426,330

(22) PCT Filed: Sep. 6, 2013

(86) PCT No.: PCT/JP2013/074022
§ 371 (c)(1),
(2) Date: Mar. 5, 2015

(87) PCT Pub. No.: WO2014/038651
PCT Pub. Date: Mar. 13, 2014

(65) Prior Publication Data
US 2015/0239392 A1  Aug. 27, 2015

(30) Foreign Application Priority Data
Sep. 7, 2012  (JP) ................................ 2012-197123

(51) Int. Cl.
*B60Q 1/04* (2006.01)
*B60Q 1/08* (2006.01)
*B60Q 1/14* (2006.01)

(52) U.S. Cl.
CPC ............... *B60Q 1/085* (2013.01); *B60Q 1/143* (2013.01); *B60Q 2300/056* (2013.01); *B60Q 2300/14* (2013.01); *B60Q 2300/41* (2013.01)

(58) Field of Classification Search
CPC ........ B60Q 1/143; B60Q 1/085; B60Q 1/14; B60Q 2300/056; B60Q 2300/14; B60Q 2300/41
See application file for complete search history.

(56) References Cited

U.S. PATENT DOCUMENTS 6,396,397 B1 * 5/2002 Bos ........................ B60N 2/002
180/167
6,587,573 B1 * 7/2003 Stam ...................... B60Q 1/085
340/930

(Continued)

FOREIGN PATENT DOCUMENTS

EP 2266837 A1 12/2010
JP 2006021631 A 1/2006

(Continued)

OTHER PUBLICATIONS

International Prelminary Report on Patentability and Written Opinion (English Translation) mailed Mar. 19, 2015 for PCT/JP2013/074022; ISA/JP/.
International Search Report (in Japanese with English Translation) for PCT/JP2013/074022, mailed Nov. 5, 2013; ISA/JP.
Written Opinion for PCT/JP2013/074022, mailed Nov. 5, 2013; ISA/JP.

*Primary Examiner* — Peggy Neils
(74) *Attorney, Agent, or Firm* — Harness, Dickey & Pierce, P.L.C.

(57) ABSTRACT

A vehicular headlamp apparatus includes: a headlamp that illuminates ahead of a vehicle; illumination range changing means for changing an illumination range of the headlamp; detecting means for detecting a position of a forward vehicle present in front of the vehicle; controlling means for controlling the illumination range changing means based on the position of the forward vehicle detected by the detecting means; and determining means for determining whether or not the position of the forward vehicle is within the illumination range. When the position of the forward vehicle is determined as being within the illumination range, the apparatus changes the illumination range so as to have the position of the forward vehicle fall outside the illumination range. When the position of the forward vehicle is determined as being outside the illumination range, the apparatus does not change the illumination range or performs, on the illumination range changing means, a control of suppressing change of the illumination range.

3 Claims, 5 Drawing Sheets

(56) References Cited

U.S. PATENT DOCUMENTS

2010/0134011 A1* 6/2010 Kobayashi ............ B60Q 1/085
                                                     315/82
2013/0039080 A1* 2/2013 Yamazaki ........... F21S 48/1784
                                                     362/465

FOREIGN PATENT DOCUMENTS

| JP | 2011001043 A | 1/2011 |
| JP | 2012020715 A | 2/2012 |
| JP | 2012162105 A | 8/2012 |

* cited by examiner 21, 22

21    E    22

VEHICULAR HEADLAMP APPARATUS

CROSS REFERENCE TO RELATED APPLICATIONS

This application is a U.S. National Phase Application under 35 U.S.C. 371 of International Application No. PCT/JP2013/074022 filed on Sep. 6, 2013 and published in Japanese as WO 2014/038651 A1 on Mar. 13, 2014. This application is based on and claims the benefit of priority from Japanese Application No. 2012-197123 filed on Sep. 7, 2012. The entire disclosures of all of the above applications are incorporated herein by reference.

TECHNICAL FIELD

The present invention relates to vehicular headlamp apparatuses.

BACKGROUND

Conventionally, there have been known Adaptive Front-Lighting Systems (AFSs) that control the directions of optical axes of headlamps according to the steering direction, so as to improve the safety of vehicles during nighttime driving.

Further, in addition to the above, there have also been known high-beam variable headlamp systems (or Adaptive Driving Beam Systems) that use a light distribution pattern called "intermediate high beam". This light distribution pattern shades a portion corresponding to a forward vehicle (a preceding vehicle or an oncoming vehicle) while illuminating the other portions with a high beam. Moreover, those systems detect the position of the forward vehicle by image-processing information from an in-vehicle camera and make the shaded portion track the forward vehicle, thereby securing the forward field of vision in a wide range and making it easy to find a pedestrian without causing glare to a driver of the forward vehicle.

Moreover, in Patent Document 1, there is disclosed a headlamp apparatus that calculates the coordinate information about a preceding vehicle based on information captured by a camera and swivels headlamps with an actuator to move the illumination range left or right, thereby making the shaded portion track the preceding vehicle.

PATENT DOCUMENT 1 Japanese Patent Application Publication No JP2012020715A

SUMMARY OF THE INVENTION

However, upon conducting a running evaluation with the headlamp apparatus disclosed in Patent Document 1 actually mounted in a vehicle, it has been made clear that it feels bothersome in some cases. For example, a preceding vehicle moves regardless of the intension of a driver of a following vehicle; therefore, when the steering of the preceding vehicle is frequently operated, it is felt that it is bothersome for the illumination range of the headlamps of the own vehicle to minutely track the movement of the preceding vehicle.

Moreover, when there is a reflective board in the vicinity of the forward vehicle, the reflective board may be misrecognized as the forward vehicle. In this case, the headlamps are swiveled so as to avert the illumination range from the reflective board in a direction away from the forward vehicle. However, since the reflective board departing from the illumination range does not reflect light, the headlamps are swiveled again so as to approach the forward vehicle. Then, the reflective board reflects light again, and thus the headlamps are swiveled again so as to avert the illumination range from the reflective board in the direction away from the forward vehicle. Consequently, a hunting phenomenon occurs in which the above processes are repeated; thus, it feels bothersome.

Furthermore, compared to a low beam, the intermediate high beam brightly illuminates not only a far area but also a near area. Therefore, the movement of the illumination range illuminating roadside trees and sound barriers is easily perceived; thus, it feels bothersome.

Though the manner of feeling those problems to be bothersome varies between individuals, some may be made unable to concentrate or become tired. Therefore, it is desirable to perform such a control as not to cause the driver to feel these bothersome problems.

SUMMARY

The present invention has been made in view of the above-described problems. It is, therefore, an object of the present invention to provide a vehicular headlamp apparatus which does not cause glare to a driver or a passenger of a preceding vehicle and does not cause a driver of an own vehicle to feel bothered.

According to the invention, which has been made for achieving the above object, a vehicular headlamp apparatus includes: a headlamp that illuminates ahead of a vehicle; illumination range changing means for changing an illumination range of the headlamp; detecting means for detecting a position of a forward vehicle present in front of the vehicle; and controlling means for controlling the illumination range changing means based on the position of the forward vehicle detected by the detecting means. The invention is characterized in that: the vehicular headlamp apparatus further includes determining means for determining whether or not the position of the forward vehicle is within the illumination range; when the position of the forward vehicle is determined by the determining means as being within the illumination range, the controlling means controls the illumination range changing means to change the illumination range so as to have the position of the forward vehicle fall outside the illumination range; and when the position of the forward vehicle is determined as being outside the illumination range, the controlling means does not change the illumination range or performs, on the illumination range changing means, a control of suppressing change of the illumination range.

With the above configuration, when the position of the forward vehicle is determined by the determining means as being within the illumination range of the headlamp, the controlling means controls the illumination range changing means to change the illumination range so as to have the position of the forward vehicle fall outside the illumination range. Consequently, a driver or a passenger of the forward vehicle will not see glare. Moreover, when the position of the forward vehicle is determined as being outside the illumination range, the controlling means does not change the illumination range or performs, on the illumination range changing means, the control of suppressing change of the illumination range. Consequently, a driver of the own vehicle will not feel bothered by frequent movement of the illumination range.

The invention is characterized in that: the detecting means includes a camera that takes images ahead of the vehicle and image processing means that produces, based on the images taken by the camera, image information including a coordinate of the forward vehicle; the detecting means identifies the position of the forward vehicle by an end coordinate which indicates the lateral position of an end of the forward vehicle in a vehicle width direction; the determining means makes the determination based on a comparison between a reference coordinate which indicates an inner boundary position of the illumination range and the end coordinate; when the position of the forward vehicle is determined by the determining means as being within the illumination range, the controlling means controls the illumination range changing means to change the illumination range so as to bring the reference coordinate into coincidence with the end coordinate.

With the above configuration, the detecting means produces, based on the images taken ahead of the vehicle, the image information including the coordinate of the forward vehicle and identifies the position of the forward vehicle by the end coordinate which indicates the lateral position of the end of the forward vehicle in the vehicle width direction. Consequently, it is possible to accurately detect the forward vehicle in a short time. Moreover, the determining means makes the determination based on the comparison between the reference coordinate which indicates the inner boundary position of the illumination range and the end coordinate; when the position of the forward vehicle is determined by the determining means as being within the illumination range, the controlling means controls the illumination range changing means to change the illumination range so as to bring the reference coordinate into coincidence with the end coordinate. Consequently, it is possible to move the illumination range to a correct position.

The invention is characterized in that the determining means calculates a deviation between the reference coordinate indicating the inner boundary position of the illumination range and the end coordinate, and makes the determination based on the deviation. With the above configuration, it is possible for the controlling means to control the illumination range changing means in the case of the deviation being large and in the case of the deviation being small separately. Consequently, it is possible to more suitably change the illumination range according to the respective cases.

DESCRIPTION

Figure 1:
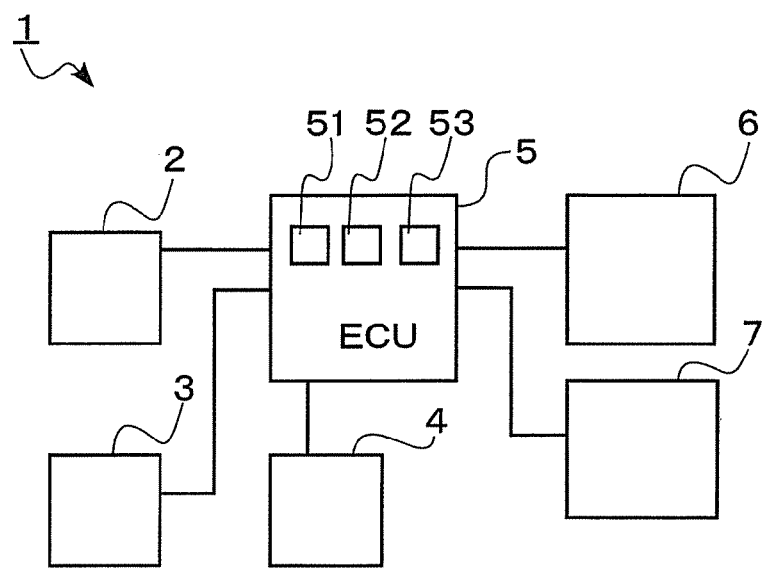
FIG. 1 is a functional block diagram illustrating the overall configuration of a vehicular headlamp apparatus according to an embodiment.

Hereinafter, a vehicular headlamp apparatus 1 according to an embodiment of the present invention will be described with reference to FIGS. 1-8. As shown in FIG. 1, the vehicular headlamp apparatus 1 includes an in-vehicle camera 2, a steering angle sensor 3, a wheel speed sensor 4, an ECU (Electronic Control Unit) 5 and headlamps 6 and 7.

The in-vehicle camera 2 is provided inside a front window of a vehicle. The in-vehicle camera 2 takes images ahead of the vehicle and sends the data to the ECU 5. The steering angle sensor 3 is an existing sensor for an ESC (Electronic Stability Control), which is provided in a steering mechanism. The steering angle sensor 3 senses a steering angle of the vehicle and sends a steering angle signal indicating the sensing results to the ECU 5. The wheel speed sensor 4 is an existing sensor provided for use in an ABS (Anti-lock Braking System). The wheel speed sensor 4 senses a rotational speed of a wheel of the vehicle and sends a wheel speed signal indicating the sensing results to the ECU 5.

The ECU 5 is a control unit for controlling the headlamps 6 and 7. Specifically, the ECU 5 has an image processing part 51, a determining part 52 and a controlling part 53. The image processing part 51 image-processes the data from the in-vehicle camera 2 and calculates the position of a forward vehicle (a preceding vehicle or an oncoming vehicle) in the form of coordinates. The determining part 52 determines the directions and amounts of deviations between the position of the forward vehicle and the illumination ranges of the headlamps. The controlling part 53 commands the headlamps 6 and 7 to perform the switching of light distribution patterns and a swivel operation. Moreover, the controlling part 53 can command, based on the steering angle signal outputted from the steering angle sensor 3 and the wheel speed signal outputted from the wheel speed sensor 4, the headlamps 6 and 7 to perform a swivel operation as in a conventional AFS.

Figure 2:
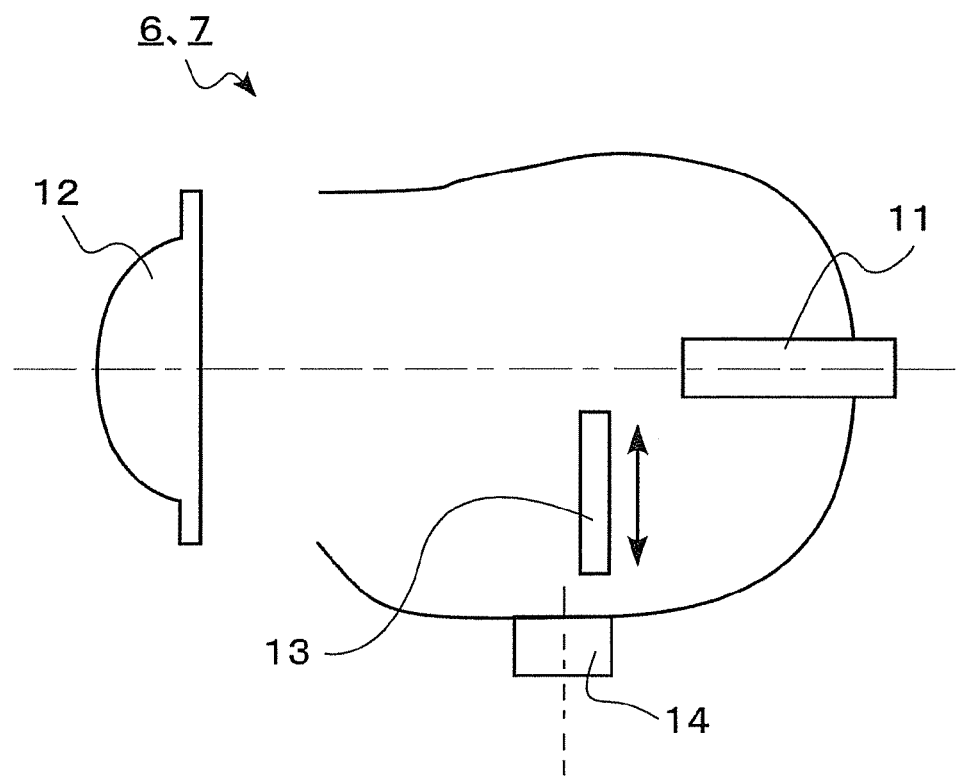
FIG. 2 is a schematic view illustrating the configuration of a headlamp.

The headlamps 6 and 7 are a pair of headlamps which are respectively provided on the left and right side of the vehicle to illuminate ahead of the vehicle. As shown in FIG. 2, each of the headlamps 6 and 7 includes a light source 11, a lens 12, a shade mechanism 13 and an actuator 14. The light source 11 is a halogen lamp. The shade mechanism 13 includes a plurality of not-shown shade plates. The shade mechanism 13 forms, according to a command from the controlling part 53 of the ECU 5, an intermediate high beam pattern and a low beam pattern by being inserted into part of an optical path formed in the headlamp to block light. Moreover, the shade mechanism 13 forms a high beam pattern by being completely retreated from the optical path. In addition, the headlamps 6 and 7 each have those three light distribution patterns.

Figure 3:
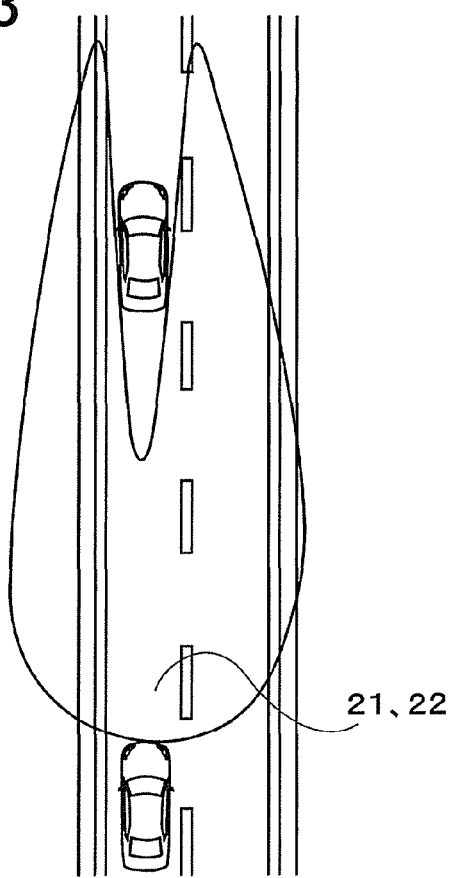
FIG. 3 is a schematic view showing the light distribution pattern of an intermediate high beam at a viewpoint from the upper side.
Figure 4:
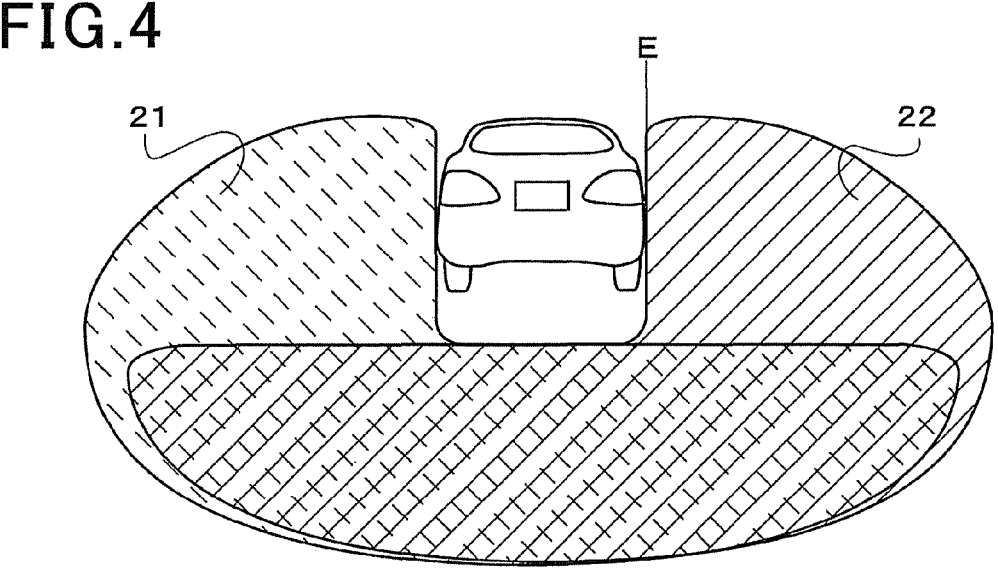
FIG. 4 is a schematic view showing the light distribution pattern of the intermediate high beam at a viewpoint from a driver's seat.

As shown in FIGS. 3-4, the intermediate high beam is a concave light distribution pattern which shades a portion corresponding to the forward vehicle so as not to cause glare to an occupant of the forward vehicle. The left headlamp defines an illumination range 21 which has a substantially L-shaped light distribution pattern. The right headlamp defines an illumination range 22 which has a light distribution pattern with a substantially mirror-reversed L-shape.

When the left and right headlamps form the intermediate high beam at the same time, a light distribution pattern as shown in FIGS. 3-4 is synthesized. Ideally, as shown in FIG.

4, it is preferable that the illumination ranges are positioned so that the positions of the left and right ends of the forward vehicle coincide with the positions of vertical cut lines of the illumination ranges. Therefore, the position of the forward vehicle is always checked and the headlamps are swiveled.

The intermediate high beam has the same brightness as the high beam except at the shaded portion. Therefore, if the intermediate high beam was accidentally irradiated on the forward vehicle and the forward vehicle was an oncoming vehicle, the light would directly enter the eyes of the driver of the oncoming vehicle to cause the driver to see glare. Moreover, if the forward vehicle was a preceding vehicle, the light reflected by mirrors would enter the eyes of the driver of the preceding vehicle and/or brightly illuminate the compartment of the preceding vehicle, thereby making it difficult to check the outside situation. Therefore, to prevent above, in the case of switching the light distribution pattern of the headlamps from the high beam or the low beam to the intermediate high beam, it is necessary to have the swivel angles calculated.

In addition, the actual light distribution pattern is not left-right symmetric, but to illuminate the left side more. However, this is irrelevant to explanation of the present invention. Therefore, for the sake of simplicity, explanation is made on the assumption that the light distribution pattern is symmetric in each of the figures.

Moreover, the headlamps 6 and 7 can be switched, by a manual switch, to the high beam, the low beam or an ADB mode. In addition, here, ADB (Adaptive Driving Beam) denotes a high-beam variable headlamp system. The ADB mode is an automatic switching mode, in which the controlling part 53 of the ECU 5 automatically sets the left and right headlamps to the high beam or controls the left and right headlamps individually to the intermediate high beam or the low beam.

Specifically, in the ADB mode, the controlling part 53 of the ECU 5 sets the left and right headlamps to the high beam when there is no vehicle ahead. Moreover, when there is a forward vehicle, the controlling part 53 of the ECU 5 sets the left and right headlamps to the intermediate high beam.

Furthermore, when a preceding vehicle makes a left turn and thus the swivel angle of the left headlamp becomes greater than a predetermined angle, the controlling part 53 of the ECU 5 switches the left headlamp to the low beam. At this time, the right headlamp is kept at the intermediate high beam. Moreover, when the forward vehicle is an oncoming vehicle advancing in a different direction and the own vehicle approaches the oncoming vehicle, the controlling part 53 of the ECU 5 keeps the left headlamp at the intermediate high beam, and switches only the right headlamp to the low beam if the swivel angle of the right headlamp becomes greater than the predetermined angle.

At the position where the shade mechanism 13 inserts and removes the shade plates as shown in FIG. 2, the up-down and left-right relationship is inverted by the lens 12. Therefore, when the shade mechanism 13 covers the lower side of the optical path as shown in FIG. 2, the upper side of the illumination range is shaded. That is, by covering a predetermined lower part of the optical path, it is possible to realize the light distribution pattern as shown in FIGS. 3-4.

The actuator 14 drives, according to a command from the controlling part 53 of the ECU 5, the entire headlamp to swivel about an axis of rotation. In the present embodiment, when the light distribution pattern of the headlamp is the low beam or the high beam, the actuator 14 drives the headlamp based on the steering angle as in a conventional AFS. In the ADB mode, only when the light distribution pattern of the headlamp is the intermediate high beam, the actuator 14 drives, based on the data from the in-vehicle camera 2 and according to the position of the forward vehicle, the headlamp to swivel so as to move the illumination range.

Figure 5:
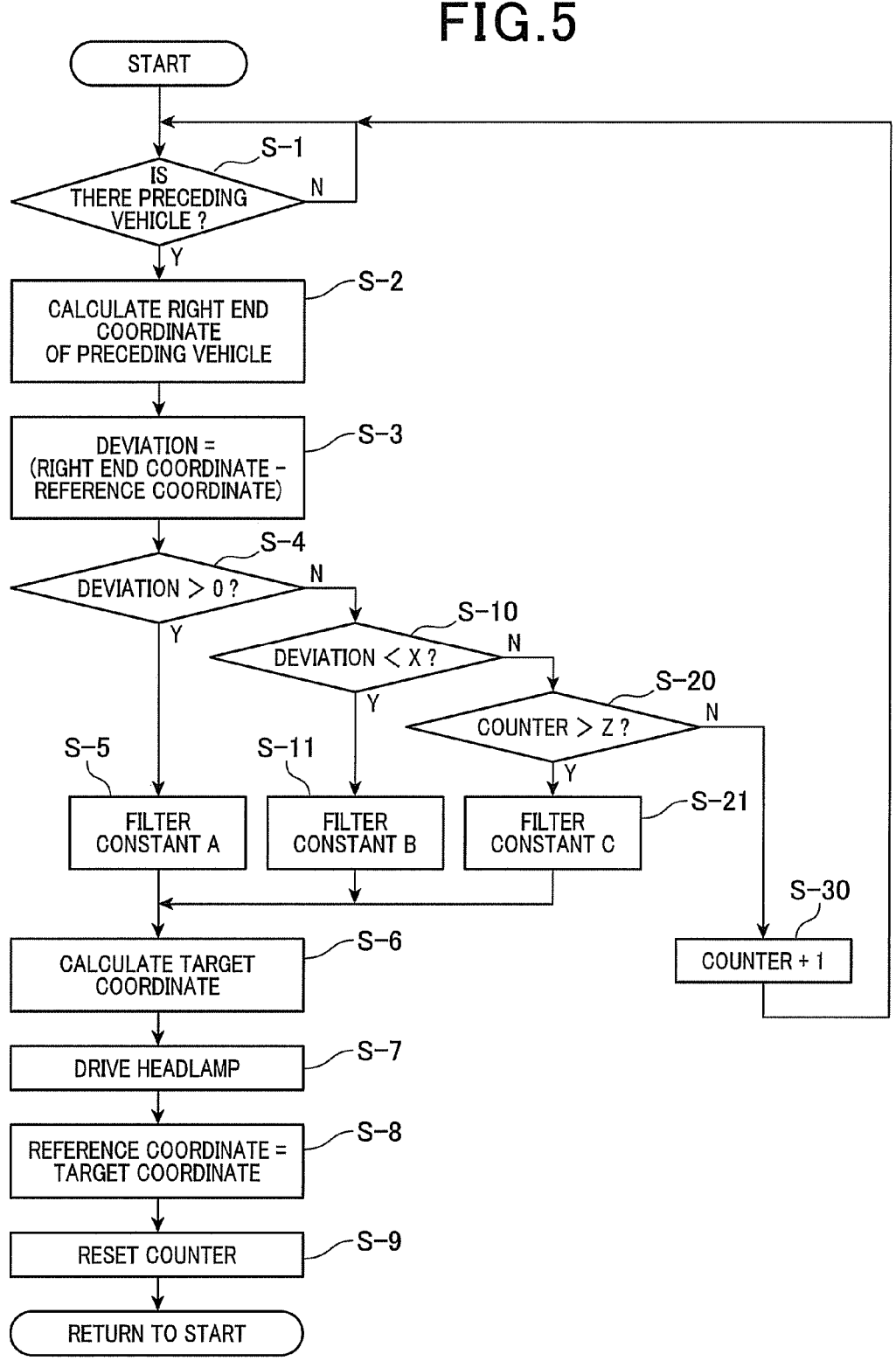
FIG. 5 is a flow chart illustrating a process of an ECU (Electronic Control Unit) for controlling the illumination range of a headlamp.

Next, the control and operation of the vehicular headlamp apparatus 1 according to the present embodiment will be described. The flowchart shown in FIG. 5 illustrates a process of the ECU 5 performed when the headlamps are set to the ADB mode and switched to the intermediate high beam. Here, the initialization of data and initial processes such as a mode determination are omitted. The "START" in FIG. 5 represents a state where those initial processes have been completed.

In addition, hereinafter, for the sake of simplicity, explanation will be made only with respect to the right end of a preceding vehicle. However, the process according to the present embodiment can also be similarly applied to the left end of the preceding vehicle and to both left and right ends of an oncoming vehicle.

Figure 6:
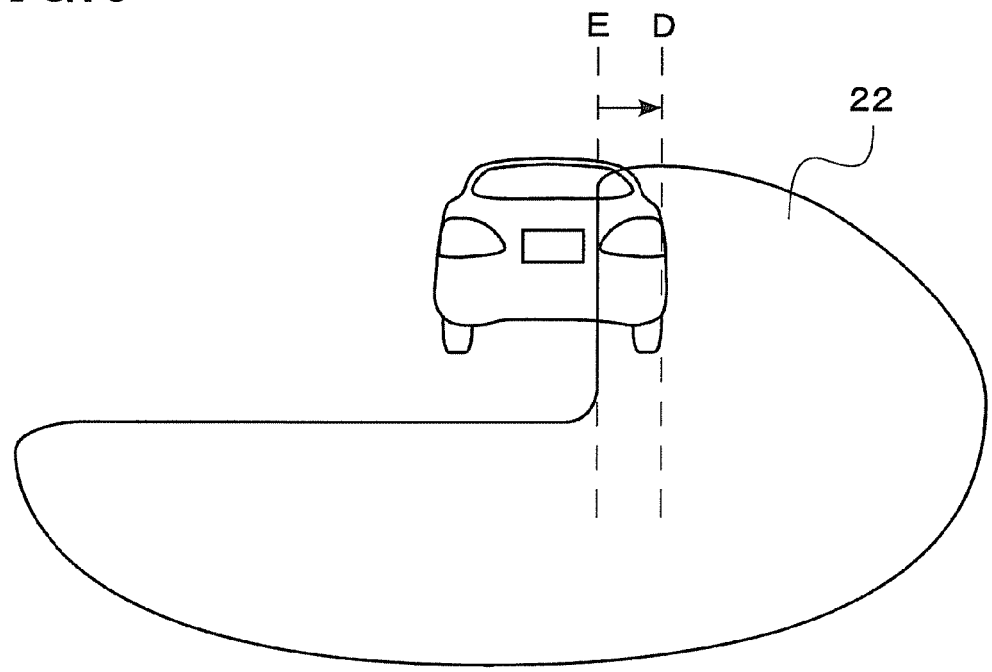
FIG. 6 is a schematic view illustrating the case of the illumination range of the headlamp overlapping a preceding vehicle.
Figure 7:
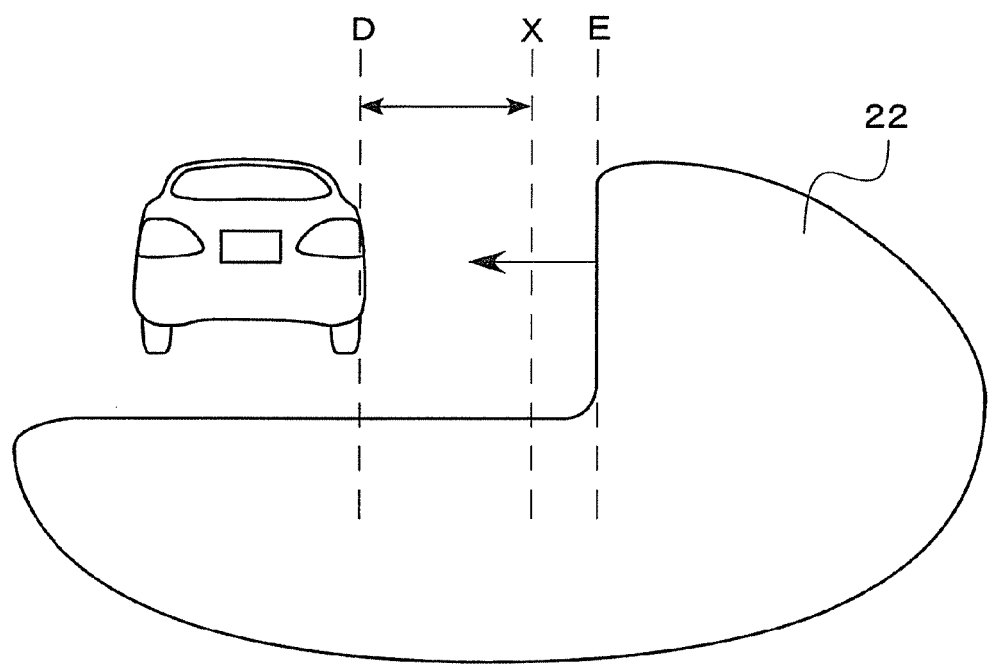
FIG. 7 is a schematic view illustrating the case of the illumination range of the headlamp being deviated from the preceding vehicle by a predetermined angle or more.
Figure 8:
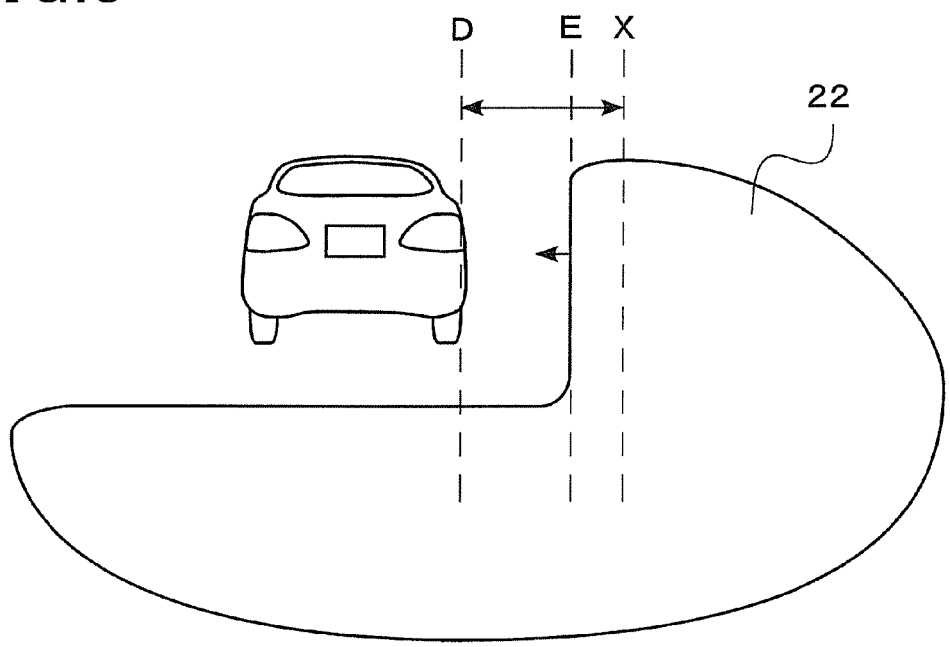
FIG. 8 is a schematic view illustrating the case of the illumination range of the headlamp being deviated from the preceding vehicle by less than the predetermined angle.

The position E, shown in FIG. 4, of the vertical cut line of the substantially reversed L-shaped light distribution pattern of the right headlamp is defined as a reference coordinate of the illumination range 22. The reference coordinate is determined based on the command information from the controlling part 53 of the ECU 5 to the actuator 14 of the headlamp. In FIGS. 6-8, the right end coordinate of the preceding vehicle is designated by D, and the reference coordinate of the illumination range 22 is designated by E.

First, if a preceding vehicle is detected (step-1, abbreviated to S-1 hereinafter; other steps are also abbreviated in the same manner), then the right end coordinate of the preceding vehicle is calculated (S-2). The right end coordinate is determined by image-processing the information from the in-vehicle camera 2 at the image-processing part 51 of the ECU 5 and detecting, for example, a pair of red taillamps.

Next, the deviation between the reference coordinate E of the illumination range 22 and the right end coordinate D of the preceding vehicle, which is considered as the deviation from an ideal state (the right end coordinate=the reference coordinate), is calculated (S-3).

$$\text{Deviation} = (\text{Right end coordinate} - \text{Reference coordinate}) \quad (1)$$

Here, let the right side in FIG. 6 be the position direction of coordinate and the left side be the negative direction. Accordingly, when the illumination range 22 illuminates the preceding vehicle as shown in FIG. 6, the deviation calculated by Equation (1) is positive (S-4: YES).

In this case, a filter constant is set to A (S-5). The filter constant A is equal to, for example, 1.0. Using the filter constant A, a target coordinate, to which the reference coordinate is to be moved, is calculated by the following Equation (2).

$$\text{Target coordinate} = \text{Filter constant} \times \text{Right end coordinate} + (1 - \text{Filter constant}) \times \text{Reference coordinate} \quad (2)$$

Since the filter constant A is set to 1.0 at S-5, the result of calculation of Equation (2) is as follows.

$$\text{Target coordinate} = \text{Right end coordinate} \quad (3)$$

That is, when the right end of the preceding vehicle enters the illumination range 22 and thus the headlamp illuminates the preceding vehicle, the headlamp is driven so as to move the reference coordinate of the illumination range 22 to the right end of the preceding vehicle (S-7). Consequently, the reference coordinate becomes equal to the target coordinate (S-8). At the same time, by Equation (3), the right end coordinate becomes equal to the reference coordinate. As a result, as shown in FIG. 4, the vehicle right end becomes coincident with the cut line of the illumination range 22. In addition, the target coordinate determined by Equation (3) is a coordinate which zeros the deviation determined at S-3. Next, a counter for another process to be described later is reset (S-9), and the process returns to START. Then, the flow from the vehicle detection (S-1) is executed again.

In practice, when the illumination range 22 as shown in FIG. 6 illuminates the preceding vehicle, the light reflected by mirrors will enter the eyes of the driver of the preceding vehicle and/or brightly illuminate the compartment of the preceding vehicle, thereby making it difficult to check the outside situation. Therefore, it is necessary to immediately move the illumination range.

In the Case of (S-4: NO)

Next, the case where the deviation calculated by Equation (1) is negative will be described. When the illumination range is deviated from the right end of the preceding vehicle as shown in FIG. 7, the deviation calculated by Equation (1) is negative (S-4: NO). In this case, a preset value X is further provided and the deviation is compared with the preset value X. Here, the preset value X is equal to, for example, −1°. Then, when the deviation is less than −1°, i.e., when the illumination range 22 is deviated from the right end of the preceding vehicle by more than 1° in absolute value (S-10: YES), the filter constant is set to B (S-11). The filter constant B is equal to, for example, 0.5. Using the filter constant B, the target coordinate, to which the reference coordinate is to be moved, is calculated by Equation (2), the result of which is as follows.

$$\text{Target coordinate}=0.5\times\text{Right end coordinate}+0.5\times\text{Reference coordinate} \quad (4)$$

That is, the target coordinate is a coordinate which internally divides the right end coordinate and the reference coordinate at the ratio of 1:1, in other words, is the mean value of the right end coordinate and the reference coordinate. Therefore, when the illumination range 22 is deviated from the preceding vehicle rightward by more than the preset value, the headlamp is driven so as to halve the deviation between the right end coordinate of the preceding vehicle and the reference coordinate of the illumination range 22 (S-7). As a result of the movement, the reference coordinate is moved to the target coordinate (S-8). In addition, the target coordinate determined by Equation (4) is a coordinate which halves the deviation determined at S-3. Next, the counter for another process to be described later is reset (S-9), and the process returns to START. Then, the flow from the vehicle detection (S-1) is executed again.

In the Case of (S-4: NO) and (S-10: NO)

Next, the case where the deviation is greater (or less in absolute value) than the preset value X will be described. When the deviation is greater than −1°, i.e., when the illumination range 22 is deviated from the right end of the preceding vehicle by 0° to 1° in absolute value (S-10: NO), the value of the counter is compared with a preset value Z (S-20). Here, the preset value Z is equal to 5. When the value of the counter is less than or equal to 5 (S-20: NO), the counter is incremented (S-30), and the process returns to S-1. Therefore, unless the positional relationship between the own vehicle and the preceding vehicle is changed, the loop S-30→S-1 is repeated. For the time period in which the loop is repeated 5 times (e.g., 1[s]/time×5 times=5[s]), the reference coordinate is maintained and the headlamp is not driven. In addition, when the positional relationship between the own vehicle and the preceding vehicle is changed, a new right end coordinate is obtained at S-2 in the next loop, and a process according to the condition is executed without waiting for 5[s].

When the value of the counter is greater than 5 (S-20: YES), the filter constant is set to C (S-21). The filter constant C is equal to, for example, 0.1. Using the filter constant C, the target coordinate, to which the reference coordinate is to be moved, is calculated by Equation (2), the result of which is as follows.

$$\text{Target coordinate}=0.1\times\text{Right end coordinate}+0.9\times\text{Reference coordinate} \quad (5)$$

That is, the target coordinate is a position which internally divides the interval between the right end coordinate and the reference coordinate in the ratio of 9:1. Therefore, when the illumination range 22 is deviated from the preceding vehicle rightward by the preset value X or less, the headlamp is driven so as to move the reference coordinate of the illumination range 22 closer to the right end of the preceding vehicle by 10% (S-7). As a result of the movement, the reference coordinate is moved to the target coordinate (S-8). In addition, the target coordinate determined by Equation (5) is a coordinate which reduces the deviation determined at S-3 to 90%. Next, the counter for S-20 is reset (S-9), and the process returns to START. Then, the flow from the vehicle detection (S-1) is executed again.

Therefore, assuming that the position of the preceding vehicle continuously satisfies the condition of S-10 being NO for more than 10[s], S-21 and the subsequent steps are executed at least twice, thereby moving the reference coordinate, which has been moved to the target coordinate at above S-7, further by 10%. In addition, compared to the reference coordinate before being moved twice, the total amount of movement is equal to 19% (i.e., 1−0.9×0.9).

As above, by repeating S-21 and the subsequent steps, the reference coordinate is made to gradually approach the right end coordinate. In practice, it is rare that the positional relationship with the preceding vehicle is unchanged for more than 10[s]. Rather, the relationship changes at any time, and thus the flow is executed with the right end coordinate newly obtained at S-2.

Consequently, it is possible to avoid annoyance due to misrecognition. For example, when there is a reflective board in the vicinity of the preceding vehicle and the reflective board is viewable from the following vehicle, as a result of image-processing the information from the in-vehicle camera 2, the light of the reflective board may be misrecognized as that of a taillamp of the preceding vehicle. In this case, S-4 will be YES, and the target coordinate will be moved to an end of the reflective board. Then, the light will become unable to reach the reflective board, and thus the taillamp of the preceding vehicle will be correctly recognized. However, S-10 will be NO, and thus the reference coordinate is maintained. Consequently, it is possible to prevent occurrence of a hunting phenomenon in which the light repeatedly becomes able and unable to reach the reflective board and the reference coordinate of the illumination range is repeatedly moved between the reflective board and the preceding vehicle's end.

The above cases where the deviation calculated by Equation (1) is negative are summarized here. In the case where the right end position of the preceding vehicle is deviated from the illumination range 22 and the deviation in absolute value is less than or equal to the preset value, if the condition continues for 5[s], the reference coordinate is maintained and the headlamp is not driven. Thereafter, the illumination range 22 is moved closer to the preceding vehicle by 10% of the deviation. Moreover, in the case where the right end position of the preceding vehicle is deviated from the illumination range 22 and the deviation in absolute value is greater than the preset value, the headlamp is swiveled so as to move the target coordinate closer to the preceding vehicle by 50% of the deviation.

In practice, when the illumination range 22 is deviated from the preceding vehicle as shown in FIGS. 7-8, there is no concern that the light of the headlamp may cause the driver of the preceding vehicle to see glare. Accordingly, it is unnecessary to immediately bring the reference coordinate of the illumination range 22 into coincidence with the right end coordinate of the preceding vehicle. Therefore, the illumination range is either moved after waiting for some time or moved by 50% of the deviation.

As made clear from the above explanation, according to the present embodiment, a vehicular headlamp apparatus (1) includes: a headlamp (6, 7) that illuminates ahead of a vehicle; illumination range changing means (the actuator 14) for changing the illumination range (21, 22) of the headlamp; detecting means (the in-vehicle camera 2, the image processing part 51) for detecting the position of a preceding vehicle running ahead of the vehicle; and controlling means (the controlling part 53) for controlling the illumination range changing means based on the position of the preceding vehicle detected by the detecting means. The apparatus further includes determining means (the determining part 52) for determining whether or not the position of the preceding vehicle is within the illumination range. When the position of the preceding vehicle is determined by the determining means as being within the illumination range, the controlling means controls the illumination range changing means to change the illumination range so as to have the position of the illumination range fall outside the illumination range. When the position of the preceding vehicle is determined as being outside the illumination range, the controlling means does not change the illumination range or performs, on the illumination range changing means, a control of suppressing change of the illumination range.

Moreover, according to the present embodiment, the detecting means includes the in-vehicle camera 2 that takes images ahead of the vehicle and image processing means (the image processing part 51) that produces, based on the images taken by the camera 2, image information including a coordinate of the preceding vehicle. The detecting means identifies the position of the preceding vehicle by an end coordinate which indicates the lateral position of an end of the preceding vehicle in a vehicle width direction. The determining means (the determining part 52) makes the determination based on a comparison between the reference coordinate which indicates an inner boundary position of the illumination range and the end coordinate. When the position of the preceding vehicle is determined by the determining means as being within the illumination range, the controlling means (the controlling part 53) controls the illumination range changing means to change the illumination range so as to bring the reference coordinate into coincidence with the end coordinate.

Moreover, according to the present embodiment, the determining means (the determining part 52) calculates a deviation between the reference coordinate indicating the inner boundary position of the illumination range 21, 22 and the end coordinate, and makes the determination based on the deviation.

Moreover, according to the present embodiment, when the deviation calculated by the determining means (the determining part 52) is greater than or equal to a preset value, the controlling means (the controlling part 53) calculates a target coordinate which internally divides the end coordinate and the reference coordinate in a predetermined ratio (first predetermined ratio), and controls the illumination range changing means (the actuator 14) to change the illumination range 21, 22 so as to bring the reference coordinate into agreement with the target coordinate. When the deviation calculated by the determining means (the determining part 52) is less than the preset value, the controlling means does not change the illumination range 21, 22 for a predetermined time in which the state continues. After the elapse of the predetermined time, the controlling means calculates a target coordinate which internally divides the end coordinate and the reference coordinate in another predetermined ratio (second predetermined ratio) different from the first predetermined ratio, and controls the illumination range changing means (the actuator 14) to change the illumination range 21, 22 so as to bring the reference coordinate into agreement with the target coordinate.

In the above-described embodiment, the deviation between the right end coordinate of the preceding vehicle and the reference coordinate is compared with the preset value X, and the process is varied according to the result of the comparison. However, it is possible to execute the process in either way regardless of the size of the deviation.

That is, regardless of the size of the deviation, the controlling means (the controlling part 53) may calculate a target coordinate which internally divide the right end coordinate and the reference coordinate in the ratio of, for example, 1:1, and then control the illumination range changing means (the actuator 14) to change the illumination range 21, 22 so as to bring the reference coordinate into agreement with the target coordinate.

With the above configuration, even when the deviation is greater than or equal to the preset value, the illumination range is not immediately brought into coincidence with the vehicle end; instead, the illumination range is changed so as to halve the deviation. By repeating this process, without performing a large operation, the position detection is made again and a target coordinate, to which the illumination range is to be changed, is calculated again based on the new deviation. Consequently, even in the case where the relative position to the forward vehicle changes left or right in a short time, it is still possible to reduce movement of the illumination range and thereby avoid the feeling of botheration.

Alternatively, regardless of the size of the deviation, the controlling means (the controlling part 53) may not change the illumination range 21, 22 for the predetermined time. After the elapse of the predetermined time, the controlling means may calculate a target coordinate which internally divide the end coordinate and the reference coordinate in the ratio of, for example, 9:1, and then control the illumination range changing means (the actuator 14) to change the illumination range 21, 22 so as to bring the reference coordinate into agreement with the target coordinate.

With the above configuration, when the position of the preceding vehicle is outside the illumination range, the illumination range is not changed for the predetermined time in which the state continues. Therefore, the illumination range is prevented from being frequently moved, and thus no feeling of discomfort is felt. Moreover, after the elapse of the predetermined time, the illumination range is changed to reduce the deviation to 90%. Therefore, repeating this process, the illumination range looks like gradually approaching the preceding vehicle. Consequently, it is possible to minimize that the driver of the own vehicle feels bothersome due to frequent movement of the illumination range.

In addition, the present invention is not limited to the above-described embodiment and modification. It goes without saying that various changes may be made without departing from the spirit of the present invention.

For example, in the above embodiment, the explanation is made with respect to a preceding vehicle. However, by configuring the in-vehicle camera 2 to detect the light of headlamps of an oncoming vehicle, it is possible to similarly detect the left and right ends of the oncoming vehicle and apply the control of the above embodiment.

Moreover, the in-vehicle camera 2 may be implemented by an existing camera used for other purposes, such as one provided in a collision avoidance system.

In the above embodiment, the filter constant B is equal to 0.5 and the filter constant C is equal to 0.1. However, the filter constants B and C may be set to other values. The target coordinate is calculated by Equation (2).

In the above embodiment, the light sources of the headlamps are implemented by halogen lamps. However, the light sources of the headlamps may be implemented by LED lamps, HID lamps (HID is a registered trademark), or other types of light sources.

In the above embodiment, the reference coordinate is determined based on the command information from the ECU 5 to the actuators 14 of the headlamps 6 and 7. However, the reference coordinate may be determined by image-processing the information from the in-vehicle camera 2 while supplementarily using the command information to the actuators 14.

In the above embodiment, the explanation is made on the premise that vehicles run on the left as in Japan and the U.K. However, the invention can also be similarly applied to cases where vehicles run on the right.

DESCRIPTION OF REFERENCE SIGNS

1: vehicular headlamp apparatus
2: in-vehicle camera
5: ECU
6, 7: headlamps
13: shade mechanism
14: actuator
21, 22: illumination ranges
52: determining part
53: controlling part

The invention claimed is:

1. A vehicular headlamp apparatus comprising:
a headlamp that illuminates ahead of a vehicle;
illumination range changing means for changing an illumination range of the headlamp;
detecting means for detecting a position of a forward vehicle present in front of the vehicle; and
controlling means for controlling the illumination range changing means based on the position of the forward vehicle detected by the detecting means,
wherein
the vehicular headlamp apparatus further comprises determining means for determining whether or not the position of the forward vehicle is within the illumination range,
when the position of the forward vehicle is determined by the determining means as being within the illumination range, the controlling means controls the illumination range changing means to change the illumination range so as to have the position of the forward vehicle fall outside the illumination range,
when the position of the forward vehicle is determined as being outside the illumination range, the controlling means does not change the illumination range or performs, on the illumination range changing means, a control of suppressing change of the illumination range,
the detecting means comprises a camera that takes images ahead of the vehicle and image processing means that produces, based on the images taken by the camera, image information including a coordinate of the forward vehicle,
the detecting means identifies the position of the forward vehicle by an end coordinate which indicates the lateral position of an end of the forward vehicle in a vehicle width direction,
the determining means makes the determination based on a comparison between a reference coordinate which indicates an inner boundary position of the illumination range and the end coordinate,
when the position of the forward vehicle is determined by the determining means as being within the illumination range, the controlling means controls the illumination range changing means to change the illumination range so as to bring the reference coordinate into coincidence with the end coordinate,
the determining means calculates a deviation between the reference coordinate indicating the inner boundary position of the illumination range and the end coordinate, and makes the determination based on the deviation,
when the deviation calculated by the determining means is greater than or equal to a preset value, the controlling means calculates a target coordinate which internally divides the end coordinate and the reference coordinate in a predetermined ratio, and controls the illumination range changing means to change the illumination range so as to bring the reference coordinate into agreement with the target coordinate.

2. The vehicular headlamp apparatus as set forth in claim 1, wherein
when the deviation calculated by the determining means is less than the preset value, the controlling means does not change the illumination range for a predetermined time in which the state continues, and
after the elapse of the predetermined time, the controlling means calculates a target coordinate which internally divides the end coordinate and the reference coordinate in a second predetermined ratio different from the predetermined ratio, and controls the illumination range changing means to change the illumination range so as to bring the reference coordinate into agreement with the target coordinate.

3. A vehicular headlamp apparatus comprising:
a headlamp that illuminates ahead of a vehicle;
illumination range changing means for changing an illumination range of the headlamp;
detecting means for detecting a position of a forward vehicle present in front of the vehicle; and
controlling means for controlling the illumination range changing means based on the position of the forward vehicle detected by the detecting means,
wherein
the vehicular headlamp apparatus further comprises determining means for determining whether or not the position of the forward vehicle is within the illumination range, when the position of the forward vehicle is determined by the determining means as being within the illumination range, the controlling means controls the illumination range changing means to change the illumination range so as to have the position of the forward vehicle fall outside the illumination range, when the position of the forward vehicle is determined as being outside the illumination range, the controlling means does not change the illumination range or performs, on the illumination range changing means, a control of suppressing change of the illumination range, the detecting means comprises a camera that takes images ahead of the vehicle and image processing means that produces, based on the images taken by the camera, image information including a coordinate of the forward vehicle, the detecting means identifies the position of the forward vehicle by an end coordinate which indicates the lateral position of an end of the forward vehicle in a vehicle width direction, the determining means makes the determination based on a comparison between a reference coordinate which indicates an inner boundary position of the illumination range and the end coordinate, when the position of the forward vehicle is determined by the determining means as being within the illumination range, the controlling means controls the illumination range changing means to change the illumination range so as to bring the reference coordinate into coincidence with the end coordinate, the determining means calculates a deviation between the reference coordinate indicating the inner boundary position of the illumination range and the end coordinate, and makes the determination based on the deviation, when the position of the forward vehicle is determined by the determining means as being outside the illumination range and the deviation is less than a preset value, the controlling means does not change the illumination range for a predetermined time in which the state continues, and after the elapse of the predetermined time, the controlling means calculates a target coordinate which internally divides the end coordinate and the reference coordinate in a predetermined ratio, and controls the illumination range changing means to change the illumination range so as to bring the reference coordinate into agreement with the target coordinate.

* * * * *